US006981249B1

(12) United States Patent
Knoblock et al.

(10) Patent No.: US 6,981,249 B1
(45) Date of Patent: Dec. 27, 2005

(54) METHODS FOR ENHANCING TYPE RECONSTRUCTION

(75) Inventors: Todd B. Knoblock, Woodinville, WA (US); Jakob Rehof, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/562,665

(22) Filed: May 2, 2000

(51) Int. Cl.$^7$ ................................................. G06F 9/45
(52) U.S. Cl. ..................................... 717/141; 717/151
(58) Field of Search ............................... 717/124–127, 717/130–137, 143–148, 151–159

(56) References Cited

U.S. PATENT DOCUMENTS

| | | | | |
|---|---|---|---|---|
| 5,812,850 | A * | 9/1998 | Wimble ...................... | 717/131 |
| 5,822,593 | A * | 10/1998 | Lamping et al. ............ | 717/161 |
| 5,848,274 | A * | 12/1998 | Hamby et al. .............. | 717/153 |
| 6,151,701 | A * | 11/2000 | Humphreys et al. ........ | 717/130 |
| 6,195,694 | B1 * | 2/2001 | Chen et al. ................. | 709/220 |
| 6,223,337 | B1 * | 4/2001 | Blume ........................ | 717/126 |
| 6,237,134 | B1 * | 5/2001 | Sundaresan ................ | 717/106 |
| 6,289,507 | B1 * | 9/2001 | Tanaka et al. .............. | 717/155 |
| 6,305,009 | B1 * | 10/2001 | Goor .......................... | 717/116 |
| 6,412,107 | B1 * | 6/2002 | Cyran et al. ................ | 717/148 |
| 6,507,946 | B2 * | 1/2003 | Alexander et al. .......... | 717/145 |
| 6,560,774 | B1 * | 5/2003 | Gordon et al. .............. | 717/146 |

OTHER PUBLICATIONS

Etienne Gagnon, Laurie Hendren; "Intra-procedural Inference of Static Types for Java Bytecode"; Sable Technical Report No. 5 Oct. 14, 1998.*
Raja Vallee-Rai, Laurie Hendren; "Jimple: Simplifying Java Bytecode for Analyses and Transformations"; Sable Research Group, McGill University, Jul. 1998.*
Christopher League et al., "Representing Java Class in a Typed Intermediate Language", ACM SIGPLAN International Conference on Functional Programming, Sep. 1999, Paris, France.*
Robert Fitzgerald et al., "Marmot: An Optimizing Compiler for Java", Microsoft Research Technical Report MSR-TR-99-33, Jun. 16, 1999.*

* cited by examiner

*Primary Examiner*—Wei Y. Zhen
(74) *Attorney, Agent, or Firm*—Woodcock Washburn LLP (57) ABSTRACT

Systems, methods, and structures are discussed that enhance type reconstruction for programs. Whereas previous methods insufficiently provide the set of types necessary for program analysis, the embodiments of the present invention can accept any verifiable bytecode programs and produce a set of types needed for program analysis. The embodiments of the present invention provide a technique called subtype completion that transforms a subtyping system by extending its type hierarchy to a lattice. However, such transformation inserts only a minimal amount of elements so as to enhance the computation of reconstructed types.

12 Claims, 10 Drawing Sheets

METHODS FOR ENHANCING TYPE RECONSTRUCTION

TECHNICAL FIELD

The technical field relates generally to program analysis. More particularly, it pertains to the enhancing of type reconstruction for bytecode programs so as to enhance program analysis.

Copyright Notice—Permission

A portion of the disclosure of this patent document contains material, which is subject to copyright protection. The copyright owner has no objection to the facsimile reproduction by anyone of the patent document or the patent disclosure as it appears in the Patent and Trademark Office patent files or records, but otherwise reserves all copyright rights whatsoever. The following notice applies to the software and data as described below and in the drawings attached hereto: Copyright© 1999, 2000, Microsoft Corporation, All Rights Reserved.

BACKGROUND

A program is a list of statements. These statements are written by a programmer in a language that is readable by humans. This list of statements may be translated, through processes that include front-end compilation, to produce an executable file that can cause a computer to perform a desired action. One front-end compilation process produces a bytecode program.

Bytecode programs are processor-independent programs that cannot be directly executed by most central processing units but are highly suitable for further processing, such as for generating binary instructions for various central processing units (CPUs). Because CPUs speedily interpret and execute binary instructions, it is advantageous to further compile the bytecode programs to produce binary instructions through a technique called back-end compilation.

A variable used in a program is expressed as a particular type. A type defines the nature of a variable. Types in programs are declared by the programmer and determine the range of values a variable can take as well as the operations that can be performed on it. Types enable a compiler to check that variables are used in a way that is consistent with their nature to avoid errors. Examples of type include integer, real number, text character, floating-point number, or classes.

The front-end compilation typically removes much of the type information in the process of producing a bytecode program. Such omission of type information constrains the ability of the back-end compilation to check for errors. Such a compilation process may produce inferior programs and lead to the eventual lack of acceptance of such programs in the marketplace.

Thus, what is needed are systems, methods, and structures to enhance reconstructing type information for bytecode programs.

SUMMARY

Systems, methods, and structures for enhancing type reconstruction are discussed. An illustrative aspect includes a system for enhancing program analysis. The system comprises a translator receptive to a first program to produce a second program and a type elaboration engine to produce an intermediate program. The type elaboration engine includes filters to produce reconstructed types of the intermediate program so as to enhance program analysis. The system further comprises an analyzer receptive to the intermediate program to produce a desired result.

Another illustrative aspect includes a method for enhancing type reconstruction. The method comprises collecting at least one constraint from an intermediate program, filtering the at least one constraint to obtain at least one solution, and constructing at least one type by selecting a minimal solution from the at least one solution.

Another illustrative aspect includes a method for collecting constraints for type reconstruction. The method comprises focusing on a portion of an intermediate program. The portion includes an unknown type and a remainder of the portion. The method further comprises determining at least one relationship between the unknown type and the remainder of the portion so as to solve the unknown type. The at least one relationship includes an equality relationship and an inequality relationship.

Another illustrative aspect includes a method for filtering to enhance type reconstruction. The method includes forming a first set of types. Each type in the first set of types has a less than or equal to relationship with respect to an unknown type. The method further comprises forming a filter for a type in the first set of types. The filter forms a second set of types. The type in the first set of types has a less than or equal to relationship with respect to each type in the second set of types. The act of forming a first set of types is iterated for each unknown type in a collection of constraints. The act of forming a filter is iterated for each type in the first set of types so as to form a plurality of the second set of types. The method further comprises intersecting each second set of types with other second sets of types to form a set of solutions to the collection of constraints.

Another illustrative aspect includes a method for constructing types. The method comprises selecting a minimal solution as a desired solution from a set of solutions that is obtained from filtering at least one constraint so as to determine an unknown type for an intermediate program of a bytecode program. The act of selecting includes mapping the desired solution to a type in a type hierarchy of a source program of the bytecode program if a one-to-one correspondence exists between the desired solution and the type in the type hierarchy. The act of selecting includes forming a desired type for the desired solution in a type hierarchy of a source program of the bytecode program if the type hierarchy lacks the desired type. The desired solution is the minimal solution when the desired solution has a greater than or equal to relationship with respect to other solutions in the set of solutions.

DETAILED DESCRIPTION

In the following detailed description of exemplary embodiments of the invention, reference is made to the accompanying drawings which form a part hereof, and in which is shown, by way of illustration, specific exemplary embodiments in which the invention may be practiced. In the drawings, like numerals describe substantially similar components throughout the several views. These embodiments are described in sufficient detail to enable those skilled in the art to practice the invention. Other embodiments may be utilized and structural, logical, electrical, and other changes may be made without departing from the spirit or scope of the present invention. The following detailed description is, therefore, not to be taken in a limiting sense, and the scope of the present invention is defined only by the appended claims.

Figure 1:
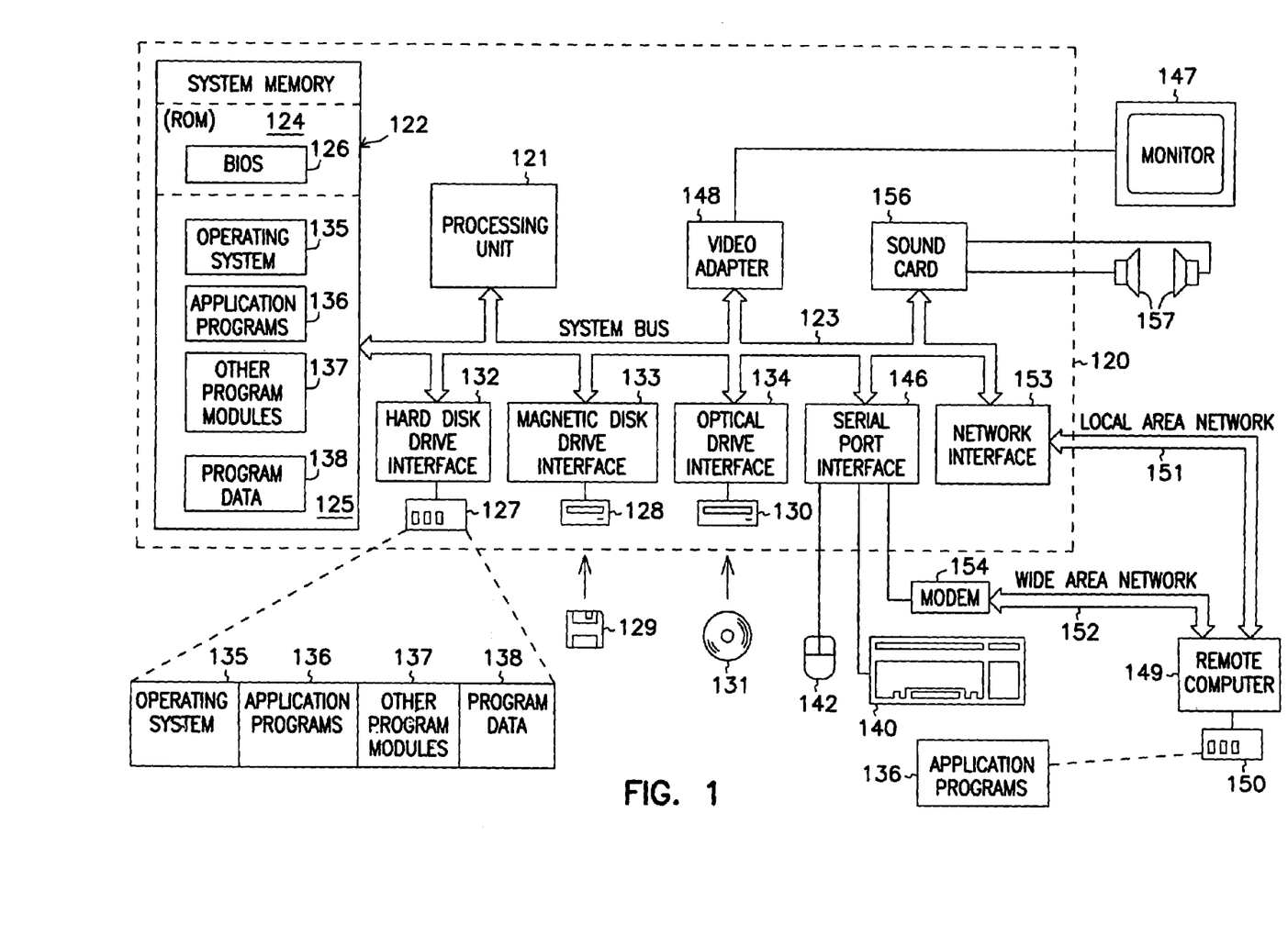
FIG. 1 is a block diagram of a system according to one aspect of the present invention.

FIG. 1 is a block diagram of a system according to one aspect of the present invention. FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc., that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like, which may have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 120, which includes processing unit 121, system memory 122, and system bus 123 that couples the system memory and other system components to processing unit 121. System bus 123 may be any of several types, including a memory bus or memory controller, a peripheral bus, or a local bus, and may use any of a variety of bus structures. System memory 122 includes read-only memory (ROM) 124 and random-access memory (RAM) 125. A basic input/output system (BIOS) 126, stored in ROM 124, contains the basic routines that transfer information between components of personal computer 120. BIOS 126 also contains start-up routines for the system. Personal computer 120 further includes hard disk drive 127 for reading from and writing to a hard disk (not shown), magnetic disk drive 128 for reading from and writing to a removable magnetic disk 129, and optical disk drive 130 for reading from and writing to a removable optical disk 131 such as a CD-ROM or other optical medium. Hard disk drive 127, magnetic disk drive 128, and optical disk drive 130 are connected to system bus 123 by a hard-disk drive interface 132, a magnetic-disk drive interface 133, and an optical-drive interface 134, respectively. The drives and their associated computer-readable media provide nonvolatile storage of computer-readable instructions, data structures, program modules, and other data for personal computer 120. Although the exemplary environment described herein employs a hard disk, a removable magnetic disk 129 and a removable optical disk 131, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 129, optical disk 131, ROM 124, and RAM 125. Program modules may include operating system 135, one or more application programs 136, other program modules 137, and program data 138. A user may enter commands and information into personal computer 120 through input devices such as a keyboard 140 and a pointing device 142. Other input devices (not shown) may include a microphone, joystick, game pad, satellite dish, scanner, or the like. These and other input devices are often connected to the processing unit 121 through a serial-port interface 146 coupled to system bus 123; but they may be connected through other interfaces not shown in FIG. 1, such as a parallel port, a game port, or a universal serial bus (USB). A monitor 147 or other display device also connects to system bus 123 via an interface such as a video adapter 148. In addition to the monitor, personal computers typically include other peripheral output devices such as a sound adapter 156, speakers 157, and further devices such as printers.

Personal computer 120 may operate in a networked environment using logical connections to one or more remote computers such as remote computer 149. Remote computer 149 may be another personal computer, a server, a router, a network PC, a peer device, or other common network node. It typically includes many or all of the components described above in connection with personal computer 120; however, only a storage device 150 is illustrated in FIG. 1. The logical connections depicted in FIG. 1 include local-area network (LAN) 151 and a wide-area network (WAN) 152. Such networking environments are commonplace in offices, enterprise-wide computer networks, intranets, and the Internet.

When placed in a LAN networking environment, PC 120 connects to local network 151 through a network interface or adapter 153. When used in a WAN networking environment such as the Internet, PC 120 typically includes modem 154 or other means for establishing communications over network 152. Modem 154 may be internal or external to PC 120, and connects to system bus 123 via serial-port interface 146. In a networked environment, program modules, such as those comprising Microsoft® Word, which are depicted as residing within PC 120 or portions thereof, may be stored in remote storage device 150. Of course, the network connections shown are illustrative, and other means of establishing a communications link between the computers may be substituted.

Software may be designed using many different methods, including object-oriented programming methods. C++ is one example of common object-oriented computer programming languages that provides the functionality associated with object-oriented programming. Object-oriented programming methods provide a means to encapsulate data members (variables) and member functions (methods) that operate on that data into a single entity called a class. Object-oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only lacking the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object-oriented programming environment.

Figure 2A:
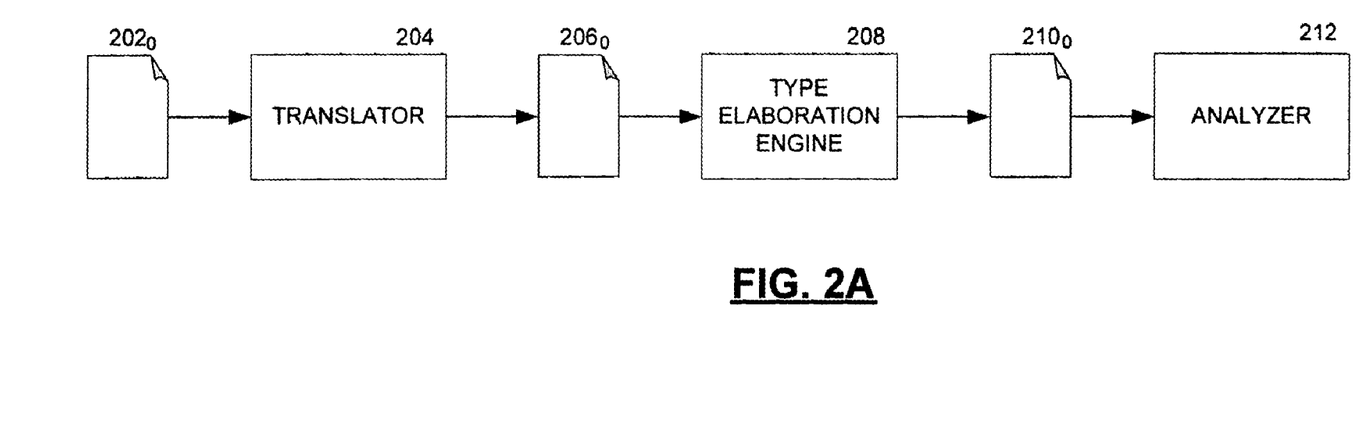
FIGS. 2A–2B are block diagrams of a system according to one aspect of the present invention.
Figure 2B:
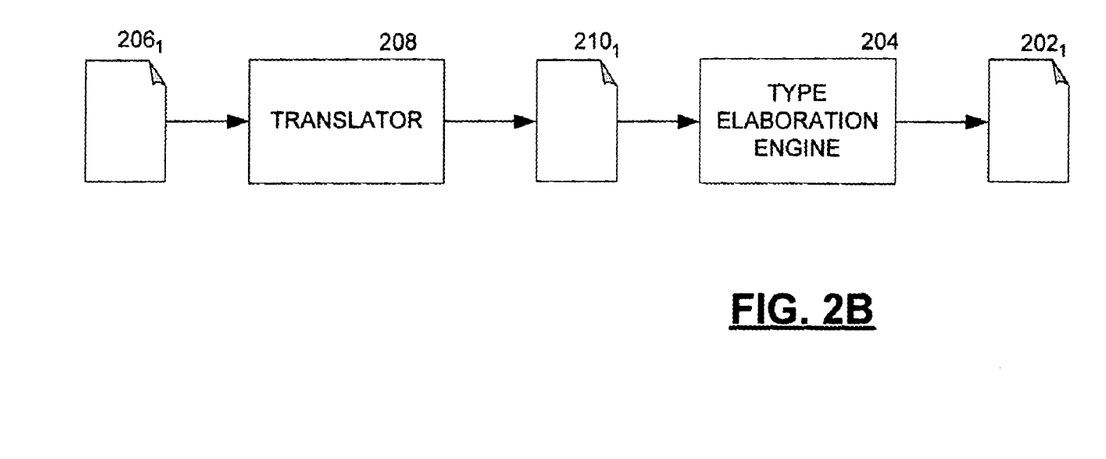

FIGS. 2A–2B are block diagrams of a system according to one aspect of the present invention. In FIG. 2A, a system includes a source program $202_0$. The source program $202_0$ includes a program that is written in a computer programming language, such as Java. The source program $202_0$ is input into a translator 204. The translator 204 translates the source program $202_0$ into a bytecode program $206_0$. In this embodiment, the translator 204 acts as a compiler.

The bytecode program $206_0$ is an encoding of the source program $202_0$ that the translator 204 produces when the source program $202_0$ is processed. This encoding is in a processor-independent form that cannot be directly executed by most central processing units but is highly suitable for further analysis. One kind of analysis includes type checking. Type checking is a process performed by a compiler or interpreter to make sure that when a variable is used, the variable is treated as having the same data type as it was declared to have. A program that passes the rigors of the type checking analysis can be considered a program with strong typing. Strong typing is typically a characteristic of a programming language that does not allow the program to change the data type of a variable during program execution. Thus, strong typing has long been recognized as improving program correctness and enhancing efficient implementation. The various embodiments of the present invention extend the benefits of strong typing characteristics to intermediate forms of the bytecode program.

But to even begin the process of type checking a program, the program has to have types. The process of encoding the source program $202_0$ by the translator 204 to produce the bytecode program $206_0$ removes some of the types that were present in the source program $202_0$. In other words, the bytecode program $206_0$ lacks some of the types that were present in the source program $202_0$. Some of the missing types include types for local variables, types for evaluation stack locations, types for small integers, such as booleans, bytes, shorts, chars, and integers. To reconstruct these types, the bytecode program $206_0$ undergoes a type inference technique called type elaboration.

Returning to FIG. 2A, the bytecode program $206_0$ is input into a type elaboration engine 208. In one embodiment, the bytecode program $206_0$ includes a verifiable bytecode program. The type elaboration engine 208 produces an intermediate program $210_0$. The type elaboration engine 208 includes filters to produce reconstructed types in the intermediate program $210_0$. Filters as discussed hereinbefore and hereinafter include using either upwardly closed sets or downwardly closed sets to filter solutions for reconstructed types. These reconstructed types help any further analysis of the intermediate program $210_0$.

The intermediate program $210_0$ is input into an analyzer 212. The analyzer 212 is receptive to the intermediate program $210_0$ to produce a desired analytical result. In one embodiment, the analyzer 212 includes a compiler optimizer that enhances the execution of the intermediate program. In another embodiment, the analyzer 212 includes an interpreter that is adapted to use the reconstructed types to securely execute the intermediate program as an applet within a browser. In another embodiment, the analyzer 212 includes a generator that generates binary instructions from the intermediate program for a desired central processing unit. In a further embodiment, the analyzer 212 includes a debugger that is adapted to debug the intermediate program; the debugger is also adapted for type checking the intermediate program using the reconstructed types so as to enhance the identification of faults. In yet another embodiment, the analyzer 212 includes a garbage collector that is adapted to eliminate at least one undesired object of the reconstructed types.

FIG. 2B includes similar elements as discussed in FIG. 2A. For clarity purposes, the numerical subscripts of some of the reference numbers have been changed to depict particular aspects of the invention. The system includes the bytecode program $206_1$. The bytecode program $206_1$ is input into the type elaboration 208 to produce the intermediate program $210_1$. In one embodiment, the bytecode program $206_1$ is a verifiable bytecode program. The intermediate program $210_1$ is then input into the translator 204 to produce a source program $202_1$. In this embodiment, the translator 204 acts as a decompiler.

Figure 3A:
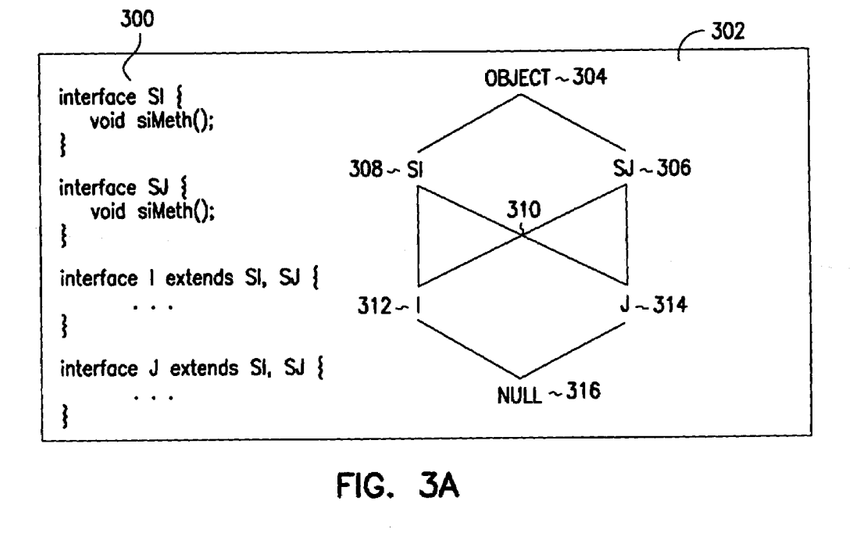
FIGS. 3A–3B illustrate a fragment of a type hierarchy according to one aspect of the present invention.
Figure 3B:
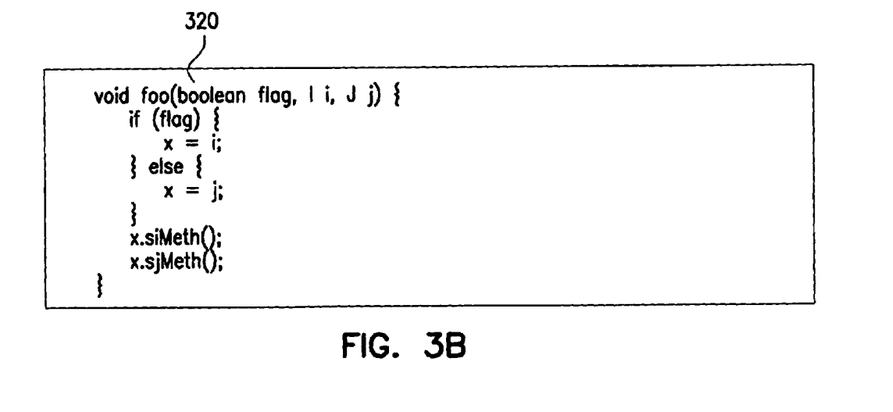

FIGS. 3A–3B illustrate a fragment of a type hierarchy according to one aspect of the present invention. In FIG. 3A, program fragment 300 includes four interface definitions that define a fragment of a type hierarchy 302. For illustrative purposes only, the program fragment 300 is a Java program fragment. Thus, the type hierarchy 302 includes an Object type 304. Although the Object type 304 is not explicitly defined in the program fragment 300, all classes automatically extend the Object type because the Object type is a supertype of all reference types in Java. The type hierarchy 302 also includes a Null type 316. Although the Null type is not explicitly defined in the program fragment 300, the Java programming language includes the Null type 316 that types a value, which is used to initialize instantiations of types.

The type hierarchy 302 includes a type SI 308 and a type SJ 306 as defined in the program fragment 300. The type hierarchy 302 also includes a type I 312 and a type J 314 as defined in the program fragment 300. Because the type I 312 and the type J 314 extend the type SI 308, two lines emanate from the type SI 308 and terminate at the type I 312 and the type J 314. Likewise, because the type I 312 and the type J 314 also extend the type SJ 306, two lines emanate from the type SJ 306 and terminate at the type I 312 and the type J 314. Therefore, the type I 312 has a multiple inheritance relationship with the type SI 308. The type J 314 has a multiple inheritance relationship with the type SJ 306.

In one embodiment, the type hierarchy 302 can be thought of as a mathematical hierarchy involving sets. For instance, the type SI 308 can be thought of as a set SI 308. The set SI 308 includes three elements, which are the type SI 308, the type I 312, and the type J 314. In the type hierarchy 302, to indirectly reference the type I 312 and the type J 314, it is possible to set the type of the indirect reference to the type SI 308 since the type SI 308 is a supertype of the type I 312 and the type J 314. Thus, the type SI 308 can be thought of as the set SI 308 containing those types as discussed. In this embodiment, the inheritance relationship between any supertype and subtype (such as the type I 312 and the type SI 308) can be mathematically described as a less than or equal to relationship (such as I≦SI). The needs for describing the type hierarchy mathematically will be discussed hereinafter.

In FIG. 3B, a method of a program 320 is shown. This method is a method of a bytecode program but has been rendered in pseudo-code for clarity purposes. As can be seen, the type of the local variable x has been removed. Such removal may have occurred during the process of compiling a source program into a bytecode program. Notwithstanding the lack of typing information for the local variable x, the embodiments of the present invention provide a constraint collection technique to learn from the remaining portions of the method 320 to solve for the type of the local variable x.

For illustrative purposes only, from the method 320, the type of x must be a type that can be assigned to the type I 312 or the type J 314 yet must be able to invoke the method siMeth( ) of the type SI 308 or the method sjMeth( ) of the type SJ 306. Mathematically, there must be an element on the type hierarchy 302 that is greater than or equal to the types I 312 and J 314 (a supertype) but is less than or equal to the types SI 308 and SJ 306 (a subtype). However, the type hierarchy 302 lacks such a type. The embodiments of the present invention form a new type 310 to solve for x. However, if the type hierarchy 302 already includes the type 310, the type 310 is selected as the desired type for x. These embodiments of the present invention are discussed in greater detail below.

Mathematically, the subtyping relationships between types in a programming language, such as Java, can be combined to form a partial ordering of the types. Thus, A is less than B if type A is a subtype of type B. The types A and B can be translated into elements of a set hierarchy with a "less than or equal to" relation. Thus, type hierarchies are partial orders (or posets) but not necessarily lattices. By definition, partial orders may lack all infimum and all supremum. However, in certain circumstances, a solution to a type reconstruction process requires that an infimum or a supremum be present in the type hierarchy. One suitable technique to add the needed infimum or supremum to partial orders includes the Dedekind-MacNeille completion. See H. M. MacNeille, *Partial Ordered Sets*, Transactions of the American Mathematical Society, 42:90–96 (1937); see also, G. Birkhoff, *Lattice Theory*, volume 25 of Colloquium Publications, American Mathematical Society (3$^{rd}$ ed. 1995); see also, B. A. Davey and H. A. Priestley, *Introduction to Lattices and Order*, Cambridge Mathematical Textbooks (1990). The use of such a technique does not limit the embodiments of the present invention, and as such, will not be presented in full here. However, to enhance the computation of the type reconstruction, it is advantageous to use a technique that adds only a minimal number of elements into the type hierarchy.

Figure 4:
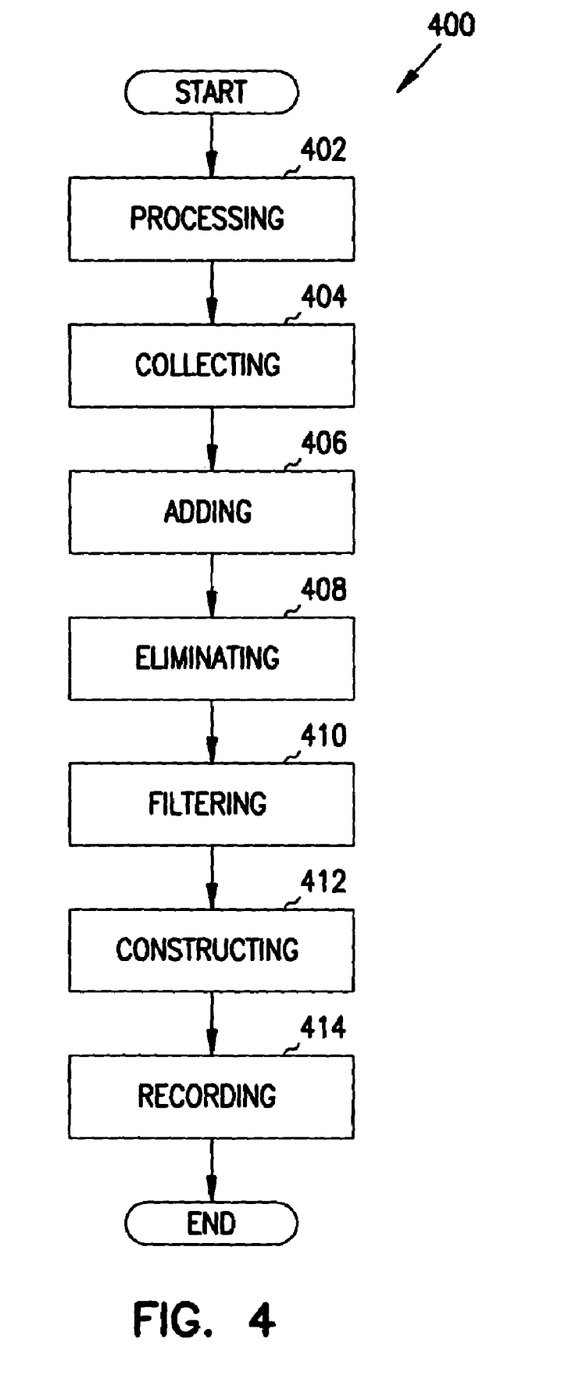
FIG. 4 is a process diagram of a method according to one aspect of the present invention.

FIG. 4 is a process diagram of a method according to one aspect of the present invention. A process 400 is a method for enhancing type reconstruction. In one embodiment, the process 400 is executed near the beginning of the compilation process. The process 400 includes an act 402 for processing preliminarily a bytecode program to produce an intermediate program. The act of processing 402 acts to condition the bytecode program by producing the intermediate program to ease the type reconstruction process. The act of processing 402 includes an act of assigning a type variable for each local variable of the bytecode program. The type variable is indicative of an unknown type. For illustrative purposes only, the unknown type may be assigned a temporary name, such as $\alpha_n$. "n" can be any integer used to uniquely identify each unknown type.

The process 400 includes an act 404 for collecting at least one constraint from the intermediate program. A constraint is a relationship between known types and unknown types. A collection of constraints may contain sufficient information regarding the relationships between types and unknown types such that a solution or a set of solutions for the unknown types emerges. These known types and unknown types are extracted from a portion of the intermediate program. The portion includes a statement, a declaration, or an expression of a bytecode program. The process 400 includes an act 406 for adding additional constraints for potential array types.

The process 400 includes an act 408 for eliminating cycles in the at least one constraint. A cycle exists when a type or an unknown type refers to itself in the collection of constraints. The act for eliminating cycles 408 improves performance of the process 400 by removing these cycles.

The process 400 includes an act 410 for filtering the at least one constraint to obtain at least one solution. The process 400 includes an act 412 for constructing at least one type by selecting a solution. The act for constructing 412 presents a type that is already known if that is the solution. Otherwise, the act for constructing 412 creates a new type.

The process 400 includes an act 414 for recording the solution for each unknown type. The act 414 for recording also resolves any the loss of type information with respect to small integer types, such as booleans, bytes, shorts, characters, and integers. Given the information provided by the collection of constraints, the type information for small integer types are made concrete in the act 414 by inserting type casting. In other words, if the bytecode convolves the integer types in a way that causes a larger integer value to be used in a context expecting a smaller integer, then appropriate type casting will be made by the act 414 for small integers.

Figure 5:
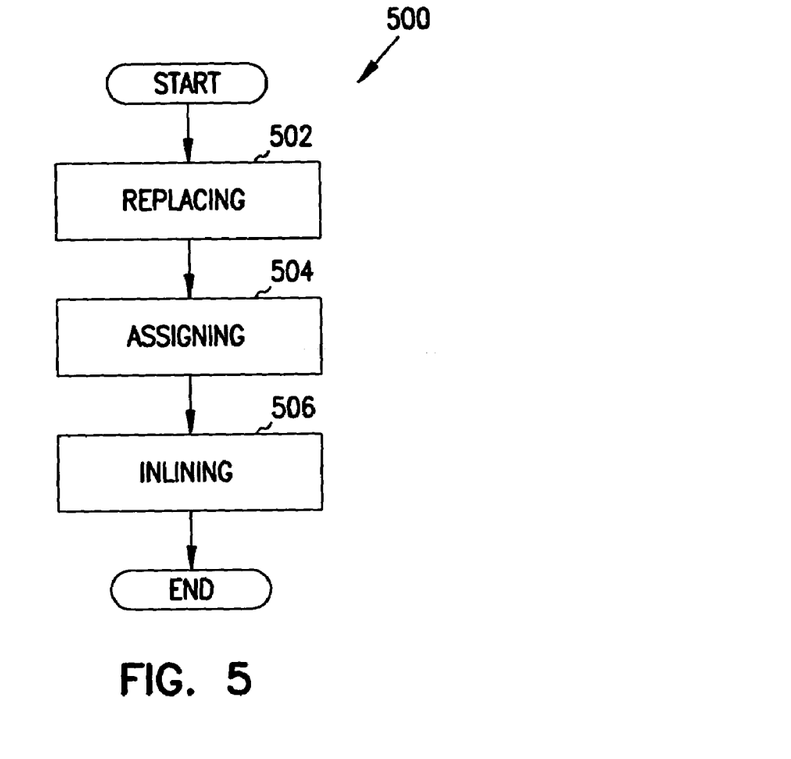
FIG. 5 is a process diagram of a method according to one aspect of the present invention.

FIG. 5 is a process diagram of a method according to one aspect of the present invention. A process 500 is a method for preliminary processing of a bytecode program to produce an intermediate program. The process 500 includes an act 502 for replacing at least one reference to a stack by at least one local variable to reduce complexity. The bytecode program is often stacked-based. Stacked-based programs are not a convenient form for further processing. Thus the act for replacing 502 replaces references in the bytecode program to the stack with explicit temporary variables. These temporary variables can be treated as local variables. However, in another embodiment, the bytecode program may be processed as is without executing the act for replacing 502.

The process 500 includes an act 504 for assigning selectively a unique name to a variable so as to inhibit ambiguous uses of the variable. The bytecode program may permit a local variable to hold values of distinct types at different places in a method of the bytecode program. However, this sort of typing defeats the impetus toward strong typing. Thus, it is necessary to separate any ambiguous uses of locals. This is accomplished by the act for assigning 504 by having each static assignment to a local variable have a unique name.

The process 500 includes an act 506 for inlining at least one subroutine that is used by the bytecode program to preserve a context of a local variable. Such a subroutine may be used to allow multiple types for the same local variable so long as that local variable is not referenced within a particular programming block, such as the "finally" block of a "try/finally" set of handlers. But again, this defeats the very benefit of strong typing. However, in one embodiment, the act for inlining 506 is optionally executed since inlining the at least one subroutine is not a necessary condition for a successful type reconstruction.

Figure 6:
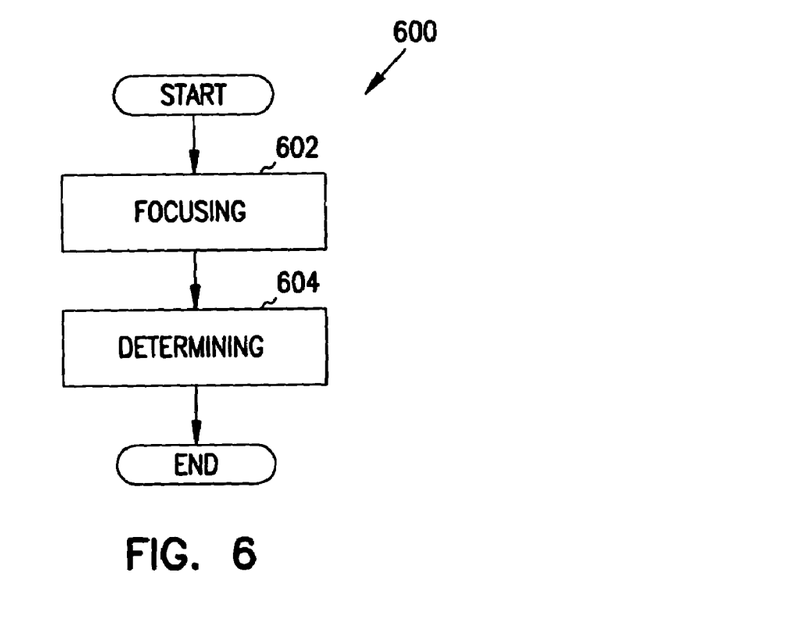
FIG. 6 is a process diagram of a method according to one aspect of the present invention.

FIG. 6 is a process diagram of a method according to one aspect of the present invention. A process 600 is a method for collecting constraints for type reconstruction. In one embodiment, the process 600 is executed to collect constraints for local variables for each method. The process 600 includes an act 602 for focusing on a portion of an intermediate program. The portion includes an unknown type and a remainder of the portion. The remainder of the portion includes additional information, such as other unknown types, known types, or relationships that can be further collected.

The process 600 includes an act 604 for determining at least one relationship between the unknown type and the remainder of the portion. The following table illustrates a portion of constraints that can be collected from an intermediate program.

The conventions of the symbols in the table can be as thus explained: The first column is simply a numerical indicator of each constraint for easy referencing in the following discussion. The second column is the nomenclature for a particular portion of a program for which constraints are being collected. The final column is the constraint information that is extracted from the said portion of the program. The constraint information includes an unknown type, a relationship, and the remainder of the portion of the program. The process 600 for collecting constraints will be iterated on the remainder of the said portion of the program to collect further constraint information.

$$I[c] = \{\alpha_c = \Sigma(c)\} \quad (1)$$

$$I[x] = \{\alpha_x = \Sigma(x)\} \quad (2)$$

$$I[e.a] = \{\alpha_e \leq \Omega, \alpha_{e.a} = I\} \cup I[e] \text{ where } \Sigma(a) = \Omega.I \quad (3)$$

$$I[f(e_1, \ldots, e_n)] = \quad (4)$$
$$\{\alpha_{f(e^1, \ldots, e^n)} = I'\} \cup \left(\bigcup_{i=1}^{n} I[e_i]\right) \cup \left(\bigcup_{i=1}^{n} \{\alpha_{ei} \leq I_i\}\right)$$
$$\text{where } \Sigma(f) = (I_i, \ldots, I_n) \rightarrow I'$$

$$I[le = e] = \{\alpha \leq \alpha_{le}\} \cup I[le] \cup I[e] \quad (5)$$

$$I[\text{return}_f e] = \alpha_e \leq I'\} \cup I[e] \text{ where } \Sigma(f) = I^\rightarrow \rightarrow I' \quad (6)$$

$$I[\text{if}(e)s_1 \text{ else } s_2] = \{\alpha_c \leq \text{Boolean}\} \cup I[e] \cup I[s_1] \cup I[s_2] \quad (7)$$

-continued $$I[\text{let } z = e \text{ in } s] = \{\alpha_c \leq \alpha_z\} \cup I[e] \cup I[s] \quad (8)$$

$$I[s_1; s_2] = I[s_1] \cup I[s_2] \quad (9)$$

$$I[f(x:\Omega', x_1:I_1, \ldots, x_n:I_n)\{s\}] = \quad (10)$$
$$\{a_x \leq \Omega', \alpha_x = \Omega\} \cup \left(\bigcup_{i=1}^{n} \{\alpha_{xi} \leq I_i\}\right) \cup I[s]$$

where $\Sigma(f) = (\Omega, I_1, \ldots, I_n) \rightarrow I'$ and $\Sigma(x) = \Omega'$, $$\Sigma(x_i) = I_i, i = 1 \ldots n$$

Every type of constraint is in a form of I[M], wherein I denotes a constraint collector, and where M is a portion of an intermediate program. Therefore, row (1) denotes constraint collection for a constant variable c. Row (2) denotes constraint collection for a parameter variable x. Row (3) denotes constraint collection for a field selection e.a. Row (4) denotes constraint collection for an invocation of a function f. Row (5) denotes constraint collection for an assignment statement. Row (6) denotes constraint collection for a return statement, where f is a function to which the return statement will return the execution of a program. Row (7) denotes constraint collection for a conditional statement. Row (8) denotes constraint collection for a local variable definition. Row (9) denotes a sequence of statements. Row (10) denotes a declaration of a function.

The right side of the equal sign in the table is the information that is extracted from the portion M of the intermediate program. Every $\alpha$ denotes an unknown type. $\Sigma$ denotes a signature, which maps field names, method names, parameters, and constants to types. The signature is intended to model declared types and the types of the basic constants of the language, which include predefined functions, such as arithmetic functions. $\Omega$ is a set of reference types. I is a set of base types. $\Omega.I$ is a set of field types. $(\Omega, I_1, \ldots, I_n) \rightarrow I'$ is a set of method types, where $\Omega$ is the type of the this pointer, $I_1, \ldots, I_n$ are the types for the parameters, and I' is the type for the return of the method.

The information includes at least one relationship. The relationship can either be an equality relationship or an inequality relationship. The equality relationship is denoted by an equal sign "=". The inequality relationship is denoted by a less than or equal to sign "$\leq$". The equality relationship defines two situations: it may define an unknown type to be a known type or it may define an unknown type to be another unknown type. In one embodiment, the equality relationship is transformed into two inequality relationships; thus, x=y may be represented as x$\leq$y and y$\leq$x. The inequality relationship may also define two situations: it may define that an unknown type has a less than or equal to relationship with a known type or it may define that an unknown type has a less than or equal to relationship with another unknown type.

The act for focusing 602 and the act for determining 604 may be iterated on the remainder of the portion to collect further constraints. The process for collecting constraints 600 may be iterated for each subroutine found in the intermediate program. In one embodiment, small integer constants are given the type of the smallest containing the small integer type.

Figure 7A:
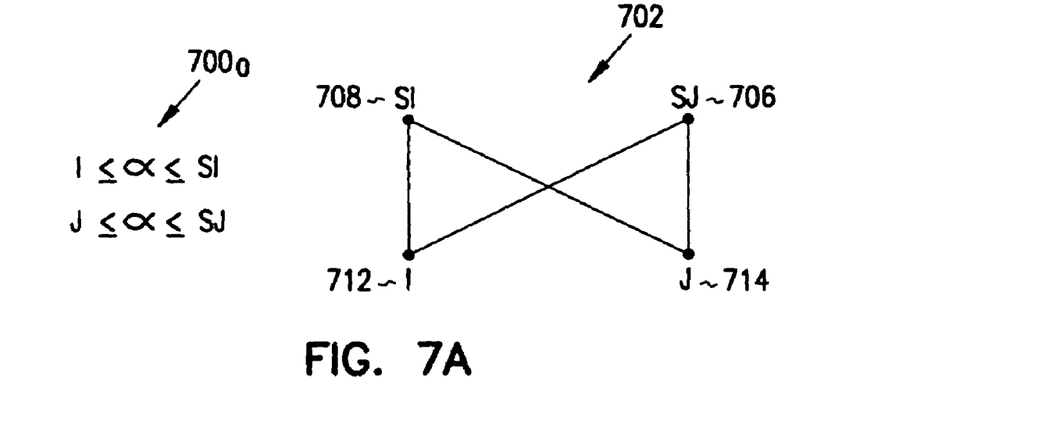
FIGS. 7A, 7B, 7C, 7D, 7E and 7F illustrate a fragment of a type hierarchy according to one aspect of the present invention.
Figure 7B:
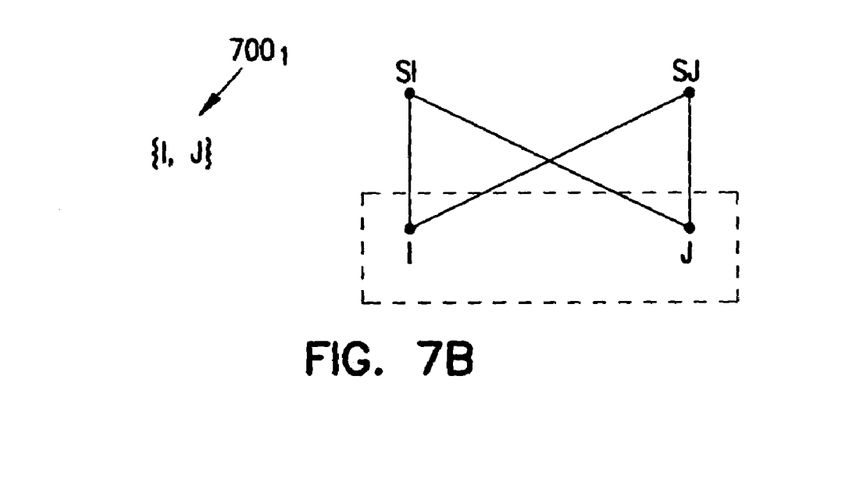
Figure 7C:
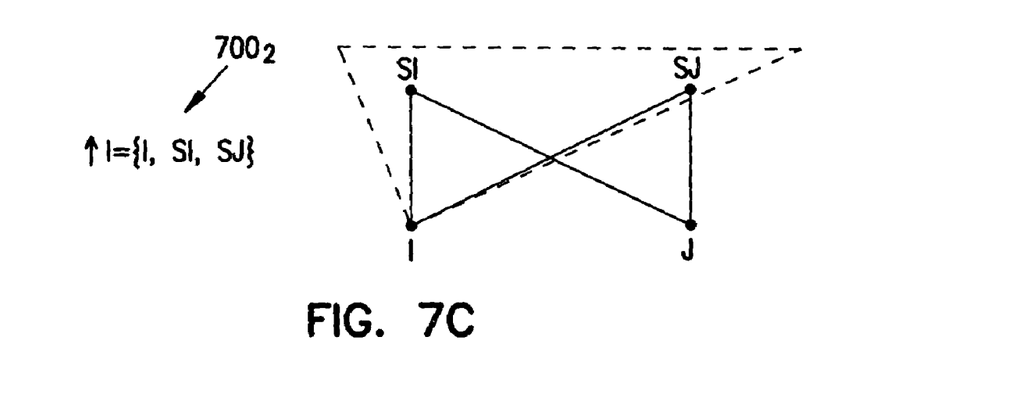
Figure 7D:
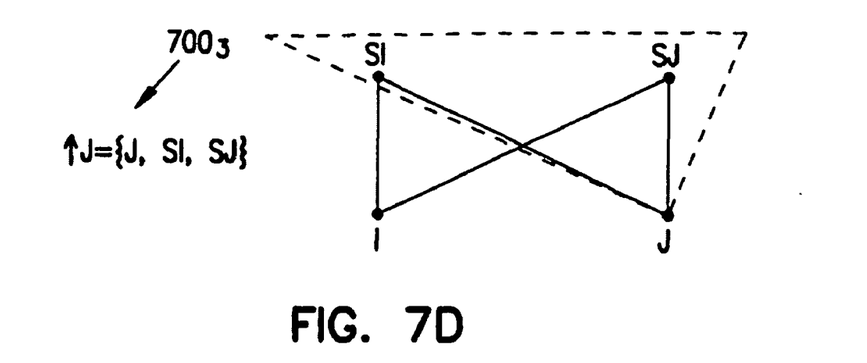
Figure 7E:
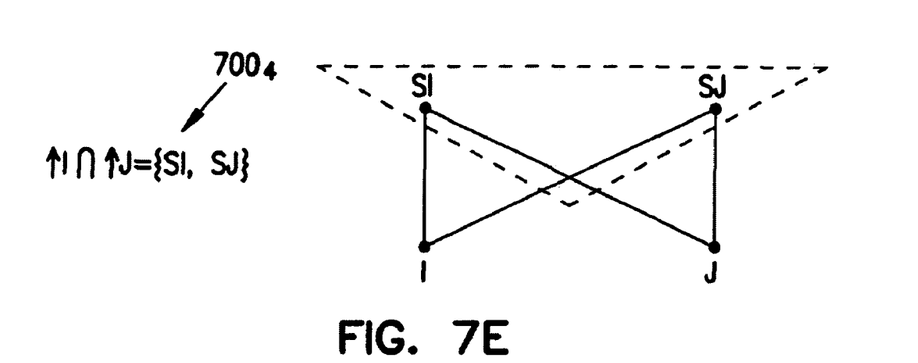
Figure 7F:
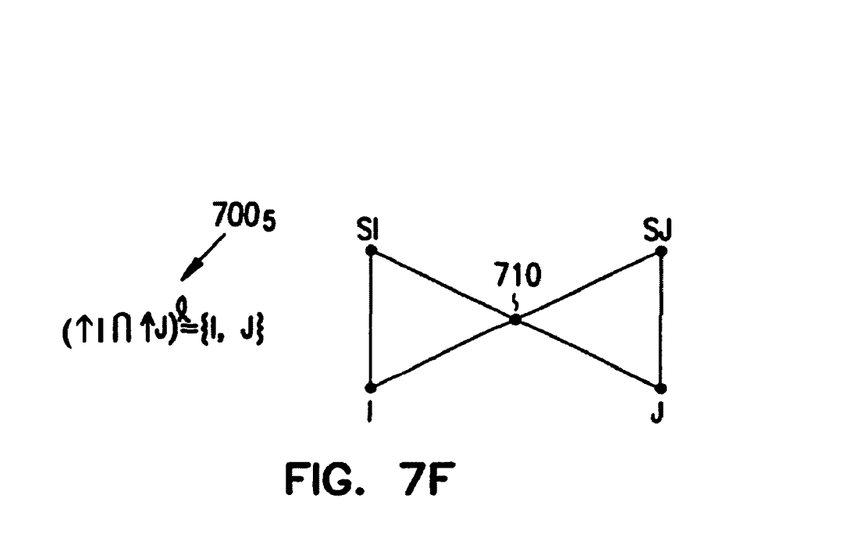

FIGS. 7A–7F illustrate a fragment of a type hierarchy according to one aspect of the present invention. FIGS. 7A–7F contain elements similar to FIG. 3A. The hereinbefore discussion relating to those similar elements is incorporated here in full. FIGS. 7A–7E illustrate a method for filtering a collection of constraints to solve for unknown types. The method for filtering as discussed hereinbefore and hereinafter includes a method that is based on using upwardly closed sets as shown in FIGS. 7A–7E. However, an equivalent method may be based on using downwardly closed sets; such a method is the inverse of the method as discussed with FIGS. 7A–7E. FIG. 7F illustrates a method for selecting a minimal solution. The specific example used in FIGS. 7A–7F is for the purpose of illustration only.

In FIG. 7A, the fragment 702 of a type hierarchy includes types SI 708 and type SJ 706. The fragment 702 also includes a type I 712 that has a subtype relationship with the type SI 708 and the type SJ 706. The fragment 702 also includes a type J 714 that has a subtype relationship with the type SI 708 and the type SJ 706. FIG. 7A also includes a collection of constraints 7000 collected from the fragment 702. The collection of constraints 7000 indicates that the unknown type a is greater than or equal to the type I 712 and the type J 714, and is less than or equal to the type SI 708 and the type SJ 706.

Hereinafter, for clarity purposes, many of the reference numbers are eliminated from subsequent drawings so as to focus on the portion of interest of the graphs of the various figures.

FIG. 7B shows the fragment 702 following the next act of processing. The first act of the method for filtering includes an act for forming a first set of types. In one embodiment, each type in the first set of types has a less than or equal to relationship with respect to the unknown type $\alpha$. The set of types in the set of constraints that are less than or equal to the unknown type $\alpha$ is the set $700_1$ which is $\{I, J\}$. Thus, the set $700_1$ is the first set of types.

FIG. 7C shows the fragment 702 following the next act of processing. The second act of the method for filtering includes an act for forming a filter for a selected type in the first set of types $700_1$. The filter forms a second set of types. In one embodiment, the selected type in the first set of types has a less than or equal to relationship with respect to each type in the second set of types. The filter is denoted by the symbol $\uparrow$. Thus, $\uparrow I$ denotes a filter for the type I 712. The $\uparrow I$ filters the type hierarchy 702 to obtain the set $700_2$ that is $\{I, SI, SJ\}$ because the type I 712 is less than or equal to the type SI 708 and the type SJ 706. In one embodiment, suppose the set $700_2$ were to be formed under an actual Java type hierarchy; the set $700_2$ would also include Object type. Thus, the set $700_2$ is the second set of types.

FIG. 7D shows the fragment 702 following the next act of processing. The act for forming a filter is iterated for each type in the first set of types $700_1$. Therefore a filter $\uparrow J$ is formed for the type J 714. The $\Diamond J$ filters the type hierarchy 702 to obtain the set $700_3$ that is $\{J, SI, SJ\}$ because the type J 714 is less than or equal to the type SI 708 and the type SJ 706. In one embodiment, suppose the set $700_3$ were to be formed under an actual Java type hierarchy; the set $700_3$ would also include Object type. Thus, the set $700_3$ is another second set of types.

FIG. 7E shows the fragment 702 following the next act of processing. In the embodiment that uses upwardly closed sets, the third act of the method for filtering includes an act for intersecting each second set of types with other second sets of types to form a set of solutions. In the embodiment that uses the downwardly closed sets, the third act of the method for filtering includes an act for causing a union of each second set of types with other second sets of types to form a set of solutions. Since the collection of constraints $700_0$ yields only two second sets of types $700_2$ and $700_3$ from the two filters $\uparrow I$ and $\uparrow J$, these two sets of types are intersected to form a final set of solutions $700_4$, which is $\{SI, SJ\}$.

FIG. 7F shows the fragment 702 following the next act of processing. The method for filtering may be followed by the method for selecting a minimal solution from the final set of solutions. The act of selecting a minimal solution includes forming a type that has a less than or equal to relationship to the final set of solutions $700_4$. This act is illustrated in the Figure by $(\uparrow I \cap \uparrow J)^I$. This type is the set $700_5$, which is $\{I, J\}$. Since this type does not exist, the embodiments of the present invention create this type and insert it in the proper location 710 in the type hierarchy 702.

Figure 8:
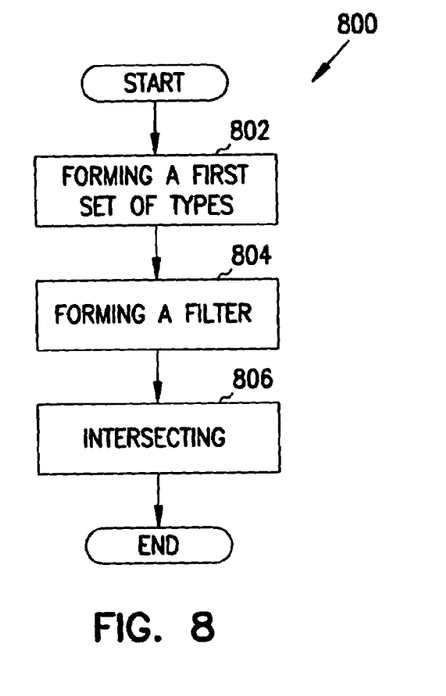
FIG. 8 is a process diagram of a method according to one aspect of the present invention.

FIG. 8 is a process diagram of a method according to one aspect of the present invention. A process 800 is a method for filtering to enhance type reconstruction. The process 800 uses upwardly closed sets. An equivalent process would use downwardly closed sets. The process 800 includes an act 802 for forming a first set of types. Each type in the first set of types has a less than or equal to relationship with respect to an unknown type. The act for forming 802 is iterated for each unknown type in a collection of constraints.

The process 800 includes an act 804 for forming a filter for a type in the first set of types. The filter forms a second set of types. The type in the first set of types has a less than or equal to relationship with respect to each type in the second set of types. The act of forming 804 is iterated for each type in the first set of types. Because the act of forming 804 is iterated for each type in the first set of types, a plurality of second sets of types may be generated.

The process 800 includes an act 806 for intersecting each set of type with other second sets of types to form a set of solutions to unknown types. The process 800 includes an act for caching the set of solutions so as to enhance incremental computation of subsequent sets of solutions. The act of caching is optionally executed.

In one embodiment, the process 800 can be described mathematically as $(\cap_{\tau \in} D_\alpha \uparrow \tau)$. This term is from the solution formula which is $\mu(\alpha) = (\cap_{\tau \in} D_\alpha \uparrow \tau)^I$. $\mu$ denotes a unique least solution to a collection of constraints C as collected by the operator I[M] as discussed above. $\alpha$ is the unknown type collected in the collection of constraints C. In order to solve for the unknown type $\alpha$, the process first computes the set of types below $\alpha$ in the collection of constraints C. This computation produces the set $D_\alpha$. The process then computes the filters generated from each element in the set $D_\alpha$ and intersects them. The unknown type $\alpha$ is then solved by mapping $\alpha$ to the set of types in a type hierarchy H, which are below every type in the intersection of filters.

The portion of the solution formula relies on types that are present in the set of constraints, avoiding a potential exponential blow up in the computation of the solutions. The duration of analysis for the solution formula is polynomial. Additionally, at least one embodiment of the present invention avoid forming ideals or sets of types by simply representing these sets with the generator type. Thus, this technique further enhances the computation of the solutions for the type reconstruction.

Figure 9:
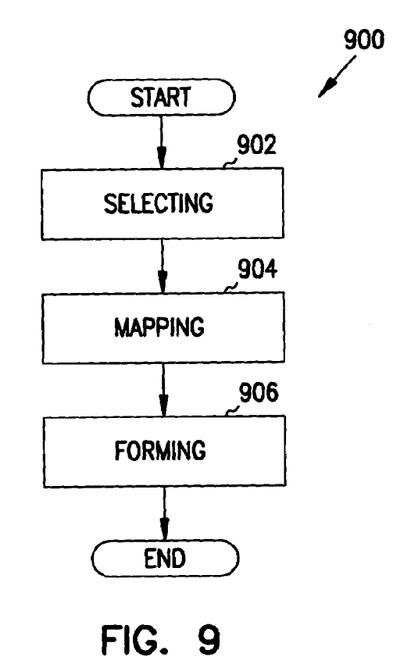
FIG. 9 is a process diagram of a method according to one aspect of the present invention.

FIG. 9 is a process diagram of a method according to one aspect of the present invention. A process 900 is a method for constructing types. The method includes an act 902 for selecting a minimal solution as a desired solution from a set of solutions. The set of solutions is obtained from filtering at least one constraint so as to determine an unknown type for an intermediate program of a bytecode program. The desired solution is the minimal solution when the desired solution has a less than or equal to relationship with respect to any other solutions in the set of solutions. The unknown type includes an array type.

In one embodiment, the act 902 for selecting a minimal solution can be described mathematically as follows. If A is a subset of a type hierarchy H and x ∈ A, then x is called a minimal element of A if and only if y=x for any element y ∈ A with y≦x. Thus, for any given set of types, a minimal type of the given set of types is one that has a less than or equal to relationship with respect to any other solutions in the set of solutions. The operator Min can be applied to a subset of the type hierarchy H. Thus, Min A denotes a set of minimal elements of A. The result of the mathematics shows that if a type hierarchy has a known type and that known type is a minimal solution to the collection of constraints, the embodiments of the present invention will choose the known type instead of creating a new type to solve the collection of constraints.

The process 900 includes an act 904 for mapping the desired solution to a type in a known type in a type hierarchy of the bytecode program if the minimal solution is a set of one solution. The process 900 includes an act 906 for forming a desired type for the desired solution in a type hierarchy if the minimal solution is a set of more than one solution.

Figure 10:
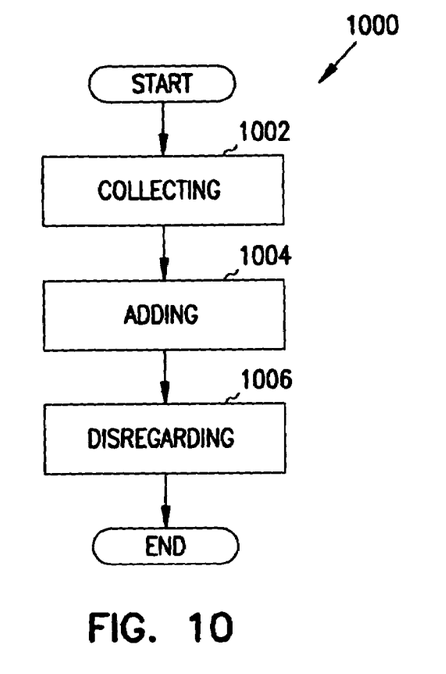
FIG. 10 is a process diagram of a method according to one aspect of the present invention.

FIG. 10 is a process diagram of a method according to one aspect of the present invention. A process 1000 is a method for collecting constraints for array types. Certain programming languages, such as Java, allow subtyping for array types. This means that not only is there a subtyping relationship between types but the subtyping relationship is extended to the array of such types. Thus, additional constraints should be added.

The process 1000 includes an act 1002 for collecting a constraint between two unknown array types. Each unknown array type includes at least one element. The constraint between the two unknown array types includes a less than or equal to relationship. The process 1000 includes an act 1004 for adding another constraint for the unknown element types of the two unknown array types. This additional constraint among the unknown element types includes a less than or equal to relationship. The act of adding 1004 can be iterated if the unknown element type is a potential array type. A potential array type is defined to be at least one of an explicit array type and an unknown type that is related to a potential array type.

The process 1000 includes disregarding the unknown element types if the two unknown array types are not an array type.

Figure 11:
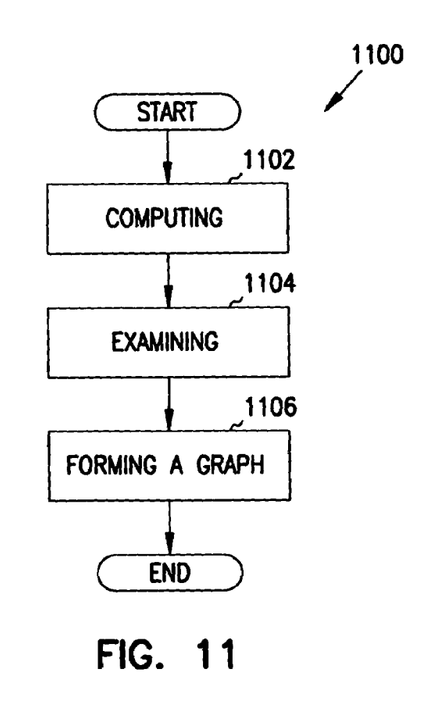
FIG. 11 is a process diagram of a method according to one aspect of the present invention.

FIG. 11 is a process diagram of a method according to one aspect of the present invention. A process 1100 is a method for eliminating cycles for type reconstruction. The process 1100 includes an act 1102 for computing a strongly connected component from a set of constraints so as to eliminate at least one cycle in the set of constraints. The strongly connected component includes a plurality of nodes. The strongly connected component includes a plurality of unknown types.

The process 1100 includes an act 1104 for examining an acyclic directed hypergraph by collapsing each node in the strongly connected component. Each unknown type in the strongly connected component is equal to the others. Each unknown type in the strongly connected component is adapted to receive the same solution in a set of solutions for the type reconstruction.

The process 1100 includes an act 1106 for forming a graph from the set of constraints for which the at least one cycle has been eliminated. This graph is called the SCC graph.

Figure 12:
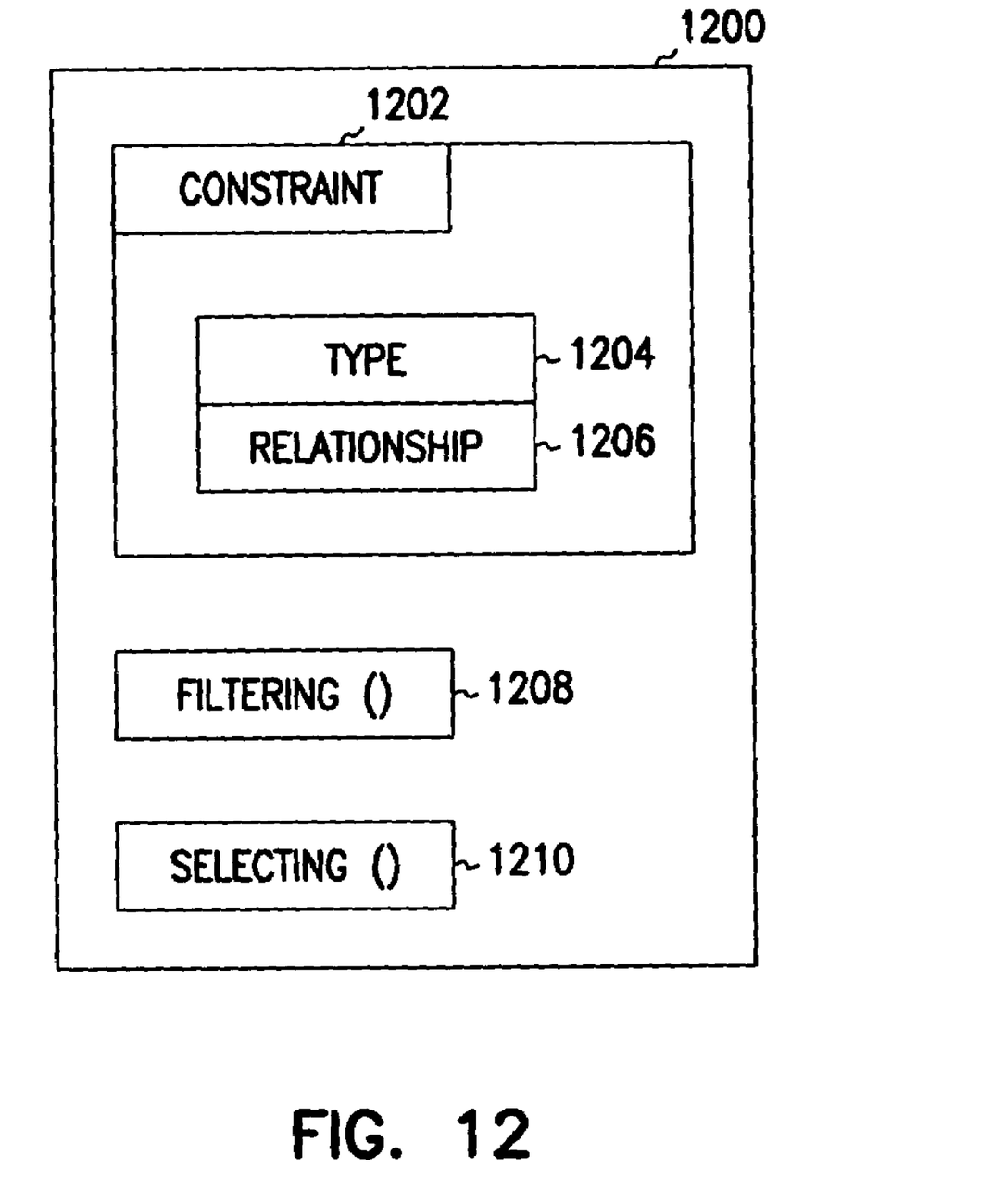
FIG. 12 is a structure diagram of a data structure according to one aspect of the present invention.

FIG. 12 is a structure diagram of a data structure according to one aspect of the present invention. A data structure 1200 is a structure for storing constraints and acting upon the constraints to form a solution to type reconstruction. The data structure 1200 includes a data member constraint 1202 to represent a constraint for a portion of a program. The data structure 1200 also includes a method member filtering 1208 for filtering at least one data member constraint 1202 to obtain a set of solutions so as to enhance type reconstruction.

The data member constraint 1202 includes a data member type 1204 to represent at least one of an unknown type and a known type. The data member constraint 1202 further includes a data member relationship 1206 to represent at least one of an equality relationship and an inequality relationship with another data member type 1204 of another data member constraint 1202.

The data structure 1200 includes a method member selecting for selecting a minimal solution as a desired solution from the set of solutions to a set of data member constraints 1202.

CONCLUSION

Methods have been described to enhance type reconstruction for programs. Such enhancement allows tools such as decompilers, interpreters, optimizers, debuggers, and garbage collectors to make superior assumptions about programs under analysis using the reconstructed types. One result from such enhancement includes software products that may run faster, contain fewer bugs, or both because the embodiments of the present invention extend the advantages of strong typing characteristics to the intermediate form of a source program. The reconstructed types are substantially similar to the original type system of the programming language of the source program, such as Java. Thus, the reconstructed types are easy for a user to read, verify, and comprehend.

The embodiments of the present invention focus on a class of bytecode programs called verifiable bytecode programs. Verifiable bytecode programs are programs of great interest since they are safe to run on computers. The type reconstruction techniques discussed hereinbefore provide substantially the extra types needed for enhancing the verification process of bytecode programs.

Although the specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

We claim:

1. A computer implemented system for enhancing program analysis, comprising: a translator receptive to remove type information from a first program to produce a second program; and a type elaboration engine to produce an intermediate program, wherein the type elaboration engine includes filters to produce reconstructed types information in the intermediate program so as to enhance program analysis; wherein the reconstructed types information is used to replace type information removed from the first program.

2. The system of claim 1, further comprising an analyzer receptive to the intermediate program to produce a desired result.

3. The system of claim 2, wherein the analyzer includes a compiler optimizer that enhances the execution of the intermediate program.

4. The system of claim 2, wherein the analyzer includes an interpreter that is adapted to use the reconstructed types to securely execute the intermediate program as an applet within a browser.

5. The system of claim 2, wherein the analyzer includes a generator that generates binary instructions from the intermediate program for a desired central processing unit.

6. The system of claim 2, wherein the analyzer includes a debugger that is adapted to debug the intermediate program, wherein the debugger is also adapted to typecheck the intermediate program using the reconstructed types so as to enhance the identification of faults.

7. The system of claim 2, wherein the analyzer includes a garbage collector that is adapted to eliminate at least one undesired object of the reconstructed types.

8. The system of claim 1, wherein the translator is selected from a group consisting of a compiler and a decompiler.

9. The system of claim 8, wherein the first program includes a source program and the second program includes a bytecode program when the translator is a compiler.

10. The system of claim 9, wherein the bytecode program is input into the type elaboration engine to produce the intermediate program, wherein the bytecode program includes a verifiable bytecode program.

11. The system of claim 8, wherein the first program includes the intermediate program and the second program includes a source program when the translator is a decompiler.

12. The system of claim 11, wherein a bytecode program is input into the type elaboration engine to produce the intermediate program, wherein the bytecode program includes a verifiable bytecode program.

* * * * *

UNITED STATES PATENT AND TRADEMARK OFFICE
CERTIFICATE OF CORRECTION

PATENT NO. : 6,981,249 B1
APPLICATION NO. : 09/562665
DATED : December 27, 2005
INVENTOR(S) : Todd B. Knoblock et al.

It is certified that error appears in the above-identified patent and that said Letters Patent is hereby corrected as shown below:

In column 9, line 56, delete "$I[e, a] = \{\alpha_e \leq \Omega, \alpha_{e,a} = I\}$" and insert -- $I[e.a] = \{\alpha_e \leq \Omega, \alpha_{e.a} = I\}$ --, therefor.

In column 9, line 61, delete "$(I_i, \ldots, I_n)$" and insert -- $(I_1, \ldots, I_n)$ --, therefor.

In column 9, line 62, delete "$\{\alpha \leq \alpha_{le}\}$" and insert -- $\{\alpha_e \leq \alpha_{le}\}$ --, therefor.

In column 9, line 64, delete "$I[return_1\ e] = \alpha_e \leq I'\}$" and insert -- $I[return_f\ e] = \{\alpha_e \leq I'\}$ --, therefor.

In column 9, line 66, delete "$\{\alpha_c \leq Boolean\} \cup I[e] \cup I[s_2] \cup I[s_2]$" and insert -- $\{\alpha_c \leq Boolean\} \cup I[e] \cup I[s_1] \cup I[s_2]$ --, therefor.

In column 10, line 3, delete "$\{\alpha_c \leq \alpha_z\}$" and insert -- $\{\alpha_e \leq \alpha_z\}$ --, therefor.

In column 10, line 8, delete " $\{\alpha_x \leq \Omega', \alpha_z = \Omega\} \cup (\bigcup_{i=1}^{n} \{\alpha_{xi} \leq I_i\})$ " and insert -- $\{\alpha_x \leq \Omega', \alpha_x = \Omega\} \cup (\cup_{i=1}^{n} \{\alpha_{xi} \leq I_i\})$ --, therefor.

In column 11, line 51, delete "$\Diamond J$" and insert -- $\uparrow J$ --, therefor.

Signed and Sealed this

Twenty-ninth Day of December, 2009

David J. Kappos
*Director of the United States Patent and Trademark Office*